(12) United States Patent
Peterson (10) Patent No.: US 10,117,371 B2
(45) Date of Patent: Nov. 6, 2018

(54) TRENCH SCOOP DEVICE (71) Applicant: Donald J. Peterson, Fortville, IN (US)

(72) Inventor: Donald J. Peterson, Fortville, IN (US)

( * ) Notice: Subject to any disclaimer, the term of this patent is extended or adjusted under 35 U.S.C. 154(b) by 321 days.

(21) Appl. No.: 14/941,815

(22) Filed: Nov. 16, 2015

(65) Prior Publication Data

US 2017/0013768 A1    Jan. 19, 2017

Related U.S. Application Data (60) Provisional application No. 62/193,530, filed on Jul. 16, 2015.

(51) Int. Cl.
*A01B 1/02* (2006.01)
*A01B 1/20* (2006.01)
*E02F 3/02* (2006.01)
*E02F 5/02* (2006.01)

(52) U.S. Cl.
CPC .............. *A01B 1/026* (2013.01); *A01B 1/20* (2013.01); *E02F 3/02* (2013.01); *E02F 5/02* (2013.01)

(58) Field of Classification Search
CPC ...... E02F 5/02; E02F 3/02; A01B 1/20; A01B 1/00; A01B 1/08; B65B 67/04
USPC ......................................... D8/10, 11; D7/691
See application file for complete search history.

(56) References Cited

U.S. PATENT DOCUMENTS

| | | | | |
|---|---|---|---|---|
| 94,303 A | * | 8/1869 | Gore | E02F 3/413 294/181 |
| 192,987 A | * | 7/1877 | Griffiths | A47F 13/08 294/180 |
| 220,576 A | * | 10/1879 | Chilis | B67D 7/0401 141/334 |
| 333,173 A | | 12/1885 | Taylor | |
| 403,310 A | * | 5/1889 | Tschumy | A01B 1/022 15/145 |
| 492,364 A | * | 2/1893 | Powers | A01B 1/06 172/354 |
| 625,629 A | | 5/1899 | Wyatt | |
| 744,338 A | * | 11/1903 | Hall | B65B 67/04 141/108 |
| 856,575 A | * | 6/1907 | Elliott | A01B 1/02 172/372 |
| 976,970 A | * | 11/1910 | Wolary | A01B 1/06 172/372 |
| 1,128,183 A | * | 2/1915 | Petrie | B65B 67/04 141/108 |
| 1,182,412 A | * | 5/1916 | Olesberg | B25F 1/00 141/108 |
| 1,220,666 A | | 3/1917 | McCormick | |
| 1,271,287 A | | 7/1918 | Daly | |
| 1,594,984 A | * | 8/1926 | Stafford | A01B 1/08 172/376 |
| 1,857,712 A | * | 5/1932 | De Martini, Jr. | A47G 19/34 222/357 |
| 2,318,277 A | | 5/1943 | Yensen | |

(Continued)

*Primary Examiner* — Jessica H Lutz (74) *Attorney, Agent, or Firm* — Woodard, Emhardt, Moriarty, McNett & Henry LLP (57) ABSTRACT A trenching tool including an elongated pole having a bottom end connected to an elbow construction. A hollow cylindrical tube is movably mounted to the bottom end of the elbow construction. The tube is opened on both ends allowing loading of and emptying material scooped from the trench. An adjustable connection secures the tube to the elbow construction.

15 Claims, 4 Drawing Sheets

(56) References Cited

U.S. PATENT DOCUMENTS

| | | | | |
|---|---|---|---|---|
| 2,536,125 A | * | 1/1951 | Crosset | B65B 67/04 141/317 |
| 2,838,856 A | * | 6/1958 | Buisse | E02F 3/405 37/404 |
| 2,903,079 A | * | 9/1959 | Dyer | A01G 1/12 172/372 |
| 3,435,903 A | * | 4/1969 | Sherrod, Jr. | A01B 1/08 172/376 |
| 3,490,501 A | * | 1/1970 | Rene | G01F 19/00 141/331 |
| 4,172,687 A | * | 10/1979 | Schultz | E02F 3/40 37/403 |
| D255,951 S | * | 7/1980 | Halls | 294/1.3 |
| 4,767,141 A | * | 8/1988 | Martin | A01B 1/02 294/181 |
| D337,244 S | * | 7/1993 | Kilham | 294/176 |
| D357,391 S | * | 4/1995 | Bench | D8/11 |
| 5,529,129 A | * | 6/1996 | Byrd | E02F 3/02 172/377 |
| 5,660,421 A | * | 8/1997 | Krenzler | A01B 1/02 294/176 |
| D387,514 S | * | 12/1997 | Savicki | 294/1.3 |
| 5,791,708 A | | 8/1998 | Capriotti | |
| 5,868,447 A | * | 2/1999 | Clark | E01H 1/1206 15/257.3 |
| 6,067,733 A | * | 5/2000 | Gasper | E02F 3/40 37/347 |
| 6,341,933 B1 | * | 1/2002 | Gagnon | E02F 3/404 37/411 |
| 6,460,911 B1 | | 10/2002 | Engelsiepen | |
| D474,082 S | | 5/2003 | Leiser | |
| 6,592,159 B1 | * | 7/2003 | Masri | B65B 67/04 141/334 |
| D533,689 S | * | 12/2006 | Borngesser | D30/162 |
| 7,188,878 B1 | * | 3/2007 | Kraus | E01H 1/1206 248/101 |
| 7,588,217 B1 | * | 9/2009 | Rooker | B65B 39/08 248/94 |
| D778,131 S | * | 2/2017 | Kalbach | D7/700 |
| 2002/0014025 A1 | * | 2/2002 | Silva, Jr. | E04D 13/0765 37/265 |
| 2009/0045641 A1 | * | 2/2009 | MacArtney Snape | A01B 1/022 172/771 |
| 2013/0015107 A1 | * | 1/2013 | Wiherle | B07B 1/02 209/235 |

\* cited by examiner

TRENCH SCOOP DEVICE

CROSS REFERENCE TO RELATED APPLICATIONS

This application claims the benefit of U.S. Provisional Application No. 62/193,530, filed Jul. 16, 2015, the entire disclosure of which is hereby incorporated by reference in its entirety.

BACKGROUND OF THE INVENTION

Field of the Invention

The present invention relates generally to the field of hand tools, namely shovels and other types of implements for removing material from the bottom of a trench.

Description of the Prior Art

My invention relates to a device for the removal, relocation, or other manipulation of excess soil, gravel, mud, sludge, water, rubble, or other debris from trenches, elongated holes, or the like. More particularly, the invention provides a means for the safe removal of material from trenches, especially deep trenches, which involves a substantial improvement over the existing practice of climbing down into the trench in order to reach the excess material.

The task of removing soil and other debris from trenches is required when installing buried utility components, including electrical and telephone lines. Cutting the trench bottom to a precise elevation is of vital importance for certain installations, particularly gravity drains. As the demand for construction and technology increases, so does demand for efficiency in all aspects of the construction process. Attempts to create a more efficient tool to perform the task of preparing trenches for utilization is apparent from the prior art.

Early scoop devices pivotally mounted to an elongated rod include the devices shown in the U.S. Pat. No. 333,173 issued to Taylor and U.S. Pat. No. 1,271,287 issued to Daly. These scoops included an open end to receive the debris and then lifted upwardly from the trench. U.S. Pat. No. 625,629 issued to Wyatt discloses a shovel or scoop fixed to the end of the elongated rod with a bend in the rod rather than a pivot connection of the scoop attached to the rod to enable the tool to be extended down into the trench. A different approach is disclosed in the U.S. Pat. No. 1,220,666 issued to McCormick wherein a shovel is pivotally mounted to the bottom of the elongated rod. In the U.S. Pat. No. 2,318,277 issued to Yensen, the shovel is offset relative to the elongated rod and does not pivot.

More recent trenching tools or shovels are disclosed in the following U.S. Pat. No. 4,767,141 issued to Martin; U.S. Pat. No. 5,529,129 issued to Byrd; U.S. Pat. No. 5,791,708 issued to Capriotti; U.S. Pat. No. 6,460,911 issued to Engelsiepen; and D474,082 issued to Leiser. These tools include a shovel or scoop fixedly mounted to the bottom of an elongated rod with neither means to adjust the cutting angle nor other advantages of capacity or functionality.

Despite the prior art devices, there is still a need for a trenching device that provides a means for the safe removal of various types of material, including liquids, from any hole or trench, and specifically deep trenches. The efficiency of use of a trenching device depends upon the construction of the scoop relative to the handle. My invention locates the connection between the handle or elongated pole and the scoop in such a manner to allow the scoop to be adjusted to an ergonomic angle or to change the function of the device. The design also incorporates a balance feature, which allows for ease of unloading by causing the loaded scoop to favor rotation on the axis of the pole handle when removed from the trench. More specifically, the connection point between the handle and scoop is positioned closer to the forward open end of the scoop as compared to the rearward open end with the scoop defining an interior volume greater between the connection point and the rearward end as compared to between the connection point and the forward end, which causes the device, upon removal from the trench, to favor rotation on the axis of the pole handle and naturally to tend to invert, thereby automatically emptying the material within the scoop.

SUMMARY OF THE INVENTION

A trench scoop comprises a pole attached to a hollow cylindrical tube. The pole has a longitudinal axis extending from its top end to its bottom end. The tube has a tubular wall with an exterior surface extending circumferential 360 degrees around and defining a passage with an open forward end and an open rearward end with the exterior surface extending there between. The open forward end opens in a direction perpendicular to the opening of the rearward end for the debris to enter the passage through the open forward end and move in the passage toward the open rearward end. A positioning means is located between the pole and tube and locates the center of gravity of the tube when loaded above the axis as the pole extends down into a trench. As the pole is lifted out of the trench, the axis extends horizontally with the center of gravity causing the loaded tube and pole to rotate around the axis.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
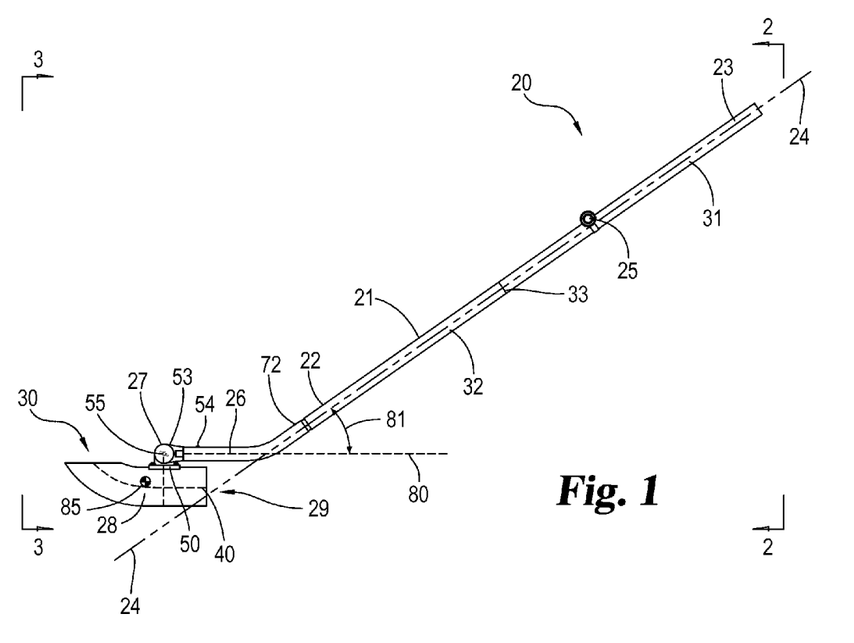
FIG. 1 is a side view of the trench scoop device incorporating the present invention.
Figure 2:
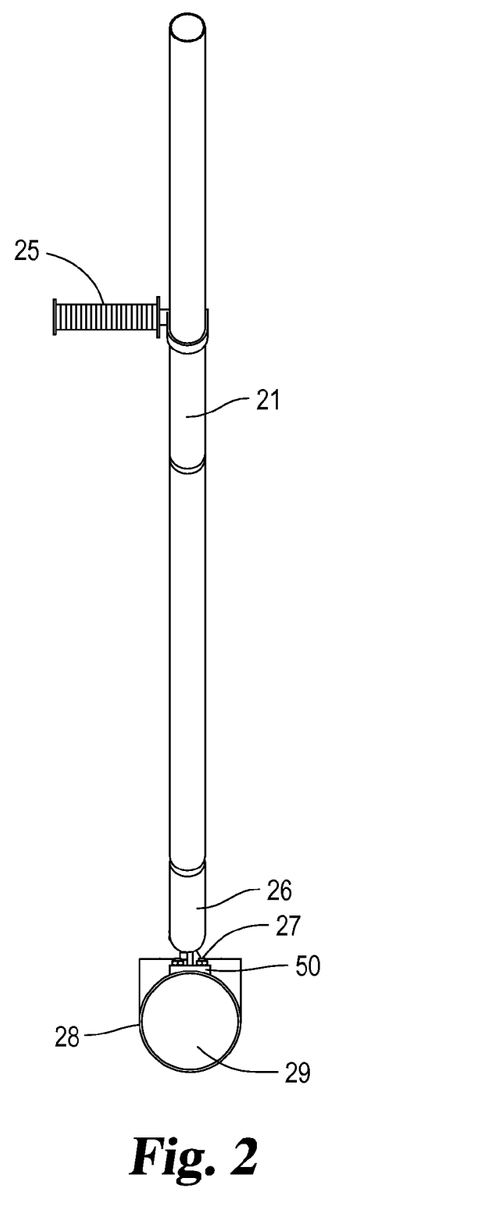
FIG. 2 is a front view of the device looking in the direction of arrows 2-2 of FIG. 1.
Figure 5:
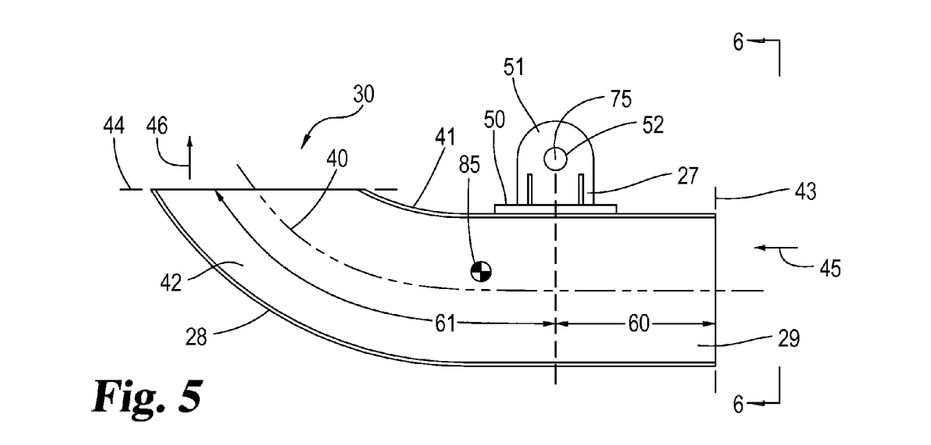
FIG. 5 is an enlarged cross-sectional view taken along a line and viewed in the direction of arrows 5-5 of FIG. 4.

Referring to the drawings and more particularly to FIG. 1, there is shown a trench scoop device 20 having an elongated pole or rod 21 with a bottom end portion 22 and a top end portion 23. A longitudinal axis 24 extends centrally through the length of pole 21 with an adjustable second handle 25 arranged to extend outwardly in a perpendicular direction from axis 24. A positioning means or elbow member 26 has an elbow configuration with an approximate 35 degree bend relative to pole 21. Member 26 has a top end 72 portion connected to the bottom end portion 22 of pole 21 with the bottom opposite end 54 portion of elbow member 26 being attached by adjustable connector 27 to a hollow cylindrical tube 28 having an entrance opening 29 and an exit opening 30. Bottom end portion 54 has a longitudinal axis 80 arranged at angle 81 relative to axis 24 of pole 21 of approximately 35 degrees. Axis 80 is parallel over a distance 60 to center line 40 (FIGS. 1 & 5), which is the center line of tube 28.

Rod 21 may consist of a single hollow rod extending from end portion 23 to end portion 22; however, the present invention includes a hollow rod having separate portions 31 and 32 removably connected together by any number of conventional means. For example, the bottom end of rod portion 31 may extend into the hollow top end of rod portion 32 forming a seam 33. A detent movable projection may be placed on the bottom end of rod portion 31 and extended into the top end of rod portion 32 and through a complementary size hole provided in a tubular wall of rod portion 32 thereby securing the two sections of the rod together. An additional rod section may be added to thereby increase the length of the device depending upon the depth of the trench or the angle desired for ergonomic operation. The deeper the trench the more rod sections would be utilized and connected together into a single rod or pole. Similarly, a detent movable projection may be placed on the bottom end of rod portion 32 and through a complimentary size hole provided in elbow member 26 for attaching such piece when desired.

Figure 3:
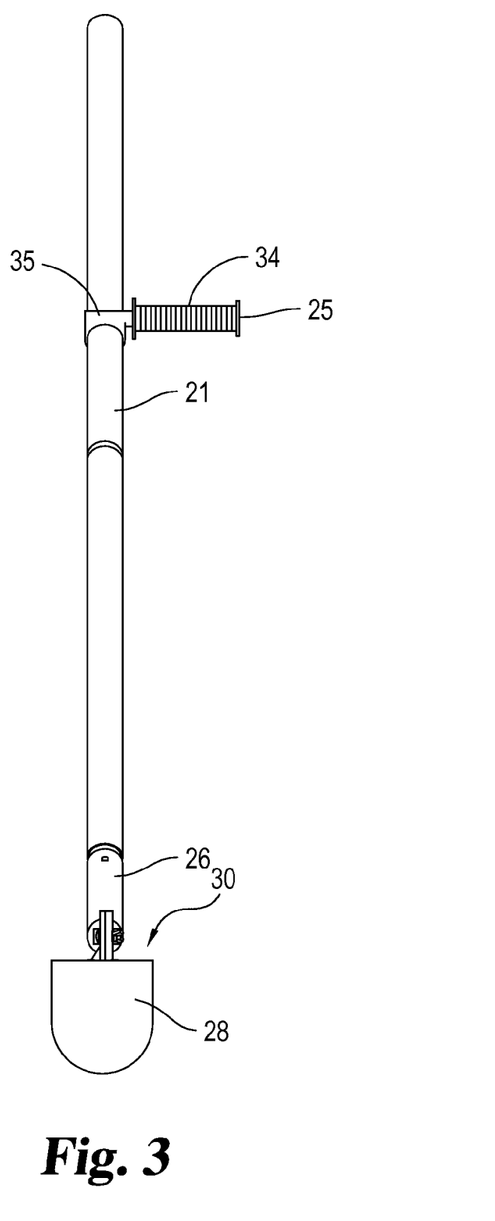
FIG. 3 is a rear view of the device looking in the direction of arrows 3-3 of FIG. 1.
Figure 4:
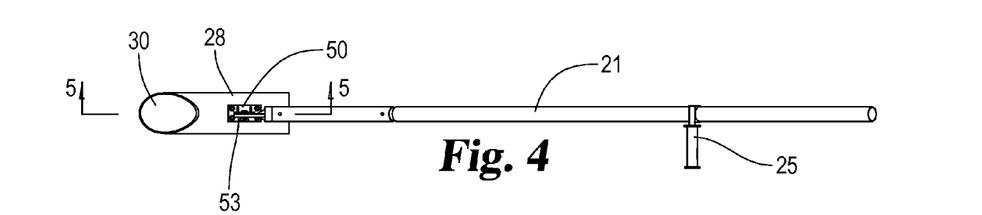
FIG. 4 is a top view thereof.

The top end portion 23 of pole 21 forms a first handle for gripping whereas handle 25 provides a second handle for gripping. Handle 25 includes a grip 34 (FIG. 3) fixedly attached to a connector 35 formed as a band extending around rod 21. Any number of conventional bands 35 are commercially available and would include an adjustable device, such as a screw for tightening and loosening the band surrounding rod 21 thereby allowing the handle to be initially positioned along the desired length on axis 24 with the screw then being tightened to securely locate the handle with respect to the pole.

Cylindrical tube 28 (FIG. 5) provides a cutting head or trenching shoe with a centrally extending line 40. Tube 28 has a constant inside diameter and has an exterior surface 41 which extends circumferentially 360 degrees around center line 40 defining a passage 42. Passage 42 has an open forward end 29 and an open rear end 30. Exterior surface 41 extends from end 29 to end 30 and provides a mounting surface upon which the adjustable connector 27 is fixedly mounted. Open end 29 is contained within vertical plane 43 as viewed in FIG. 5 which may be arranged perpendicularly relative to plane 44 containing open rear end 30 as viewed in FIG. 5. Open end 29 opens in a horizontal direction 45 arranged perpendicularly relative to the vertical direction opening 46 of end 30 as viewed in FIG. 5. Pole 21 may therefore be pulled in a direction opposite of arrow 45 at the bottom of a trench allowing the material to be collected to enter into passage 42 via open end 29 and then moving in the passage toward end 30. Pole 21 also may be pushed in the direction of arrow 45, using a back and forth motion to assist in flattening or contouring the trench bottom.

A connecting means or adjustable connector 27 (FIG. 5) on tube 28 has a first mount consisting of a plate 50 forming a flanged end fixedly secured to exterior surface 41 with connector 27 being offset along center line 40 to be closer to end 29 as compared to end 30. An upstanding wall 51 has a bottom end fixedly secured atop plate 50 with a hole 52 centrally located on wall 51 to receive a conventional fastener 55 extending there through and also through a plate 53 (FIG. 6) fixedly attached to the bottom end of elbow member 26 or pole 21 if elbow member 26 is not in use. Fastener 55 extends through flanges 53 and 51 securing the flanges together. These flanges and fasteners may take the form of a tooth axle and pin connector. Fastener 55 may be loosened allowing flanges 50 and 51 to be rotated relative to each other about axis 75 positioning tube 28 relative to axis 75 with fastener 55 then being tightened. Tube 28 rotates on axis 75 (FIG. 6) extending through hole 52 (FIG. 5) allowing the tube to move clockwise or counterclockwise as viewed in FIG. 5. Axis 75 is forward of the mid-point length of tube 28.

Figure 7:
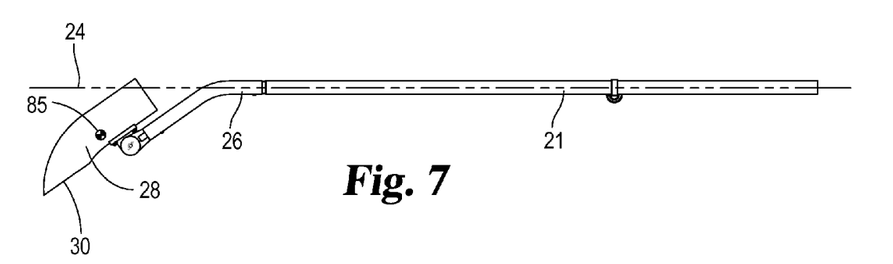
FIG. 7 is the same view as FIG. 1 only with the trench scoop device rotated 180 degrees about horizontal axis 24.

The interior diameter of the tube is constant with the result that the interior volume in the rearward portion of the passage, extending along center line 40 a distance 61 from immediately beneath axis 75 to the open rearward end 30, is greater than the interior volume of the passage in the forward portion, extending along center line 40 a distance 60 from immediately beneath axis 75 to the open forward end 29. As the passage is loaded, the rearward portion of the tube becomes heavier than the forward portion of the passage. As the tube is being lifted from the trench, the trench side walls will keep the tube from rotating. Once lifted free of the trench, the loaded tube will naturally favor rotation on the axis of the pole (axis 24), and the entire device may be rotated about axis 24, which tilts rearward end 30 downward (FIG. 7) and allows the tube to invert and discharge the material therein. The secondary adjustable handle 25 allows control for returning the device to the dig position or to roll the device if the cylinder is not loaded enough to be top heavy.

Figure 6:
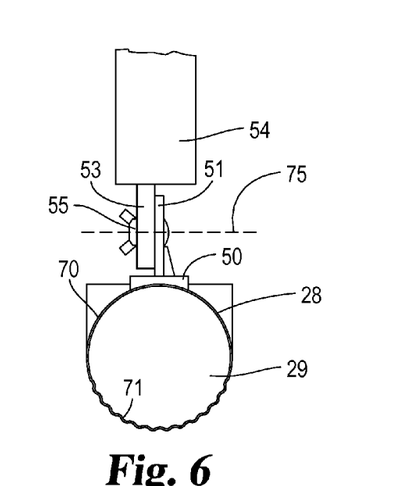
FIG. 6 is an end view looking in the direction of arrows 6-6 of FIG. 5.

In the event elbow construction 26 is not used and instead connector 27 on tube 28 is mounted directly to the bottom end of pole 21, the weight of material scooped into tube 28 is mostly located forward of axis 75 (FIG. 6). In such a case, axis 24 extends through the center of the load resulting in the load and tube remaining fairly stable. By installing elbow construction 26 between the tube and pole as illustrated in FIG. 1, tube 28 and its load of material is located above axis 24 (FIG. 1) thereby locating the center of gravity 85 (FIGS. 1 & 5) of the tube and load above axis 24 creating instability as the pole is lifted out of the trench to a horizontal position and allowing the device to rotate on axis 24.

The adjustable connector is located exteriorly of the hollow tube so that the debris moved through passage 42 is not impeded by the connector 27. Further, connector 27 is spaced apart from passage 42 with the exterior surface 41 limiting contact between adjustable connector 27 and the material moving through the passage.

In one embodiment, tube 28 was produced from steel whereas the pole 21 was produced from fiberglass. The steel edge 70 surrounding entrance end 29 may be either smooth or scalloped. FIG. 6 depicts end 70 as having a scalloped configuration 71 thereby providing a superior cutting edge in the event the material to be removed is compacted.

The device is generally T-shaped and constructed of any suitable material such as steel, aluminum or other alloys. The device has an elongated pole assembly that functions as a handle, with a tubular scooping cylinder with a radius bend and openings on each end that is attached generally perpendicularly to the pole handle with an adjustable toothed axle & pin (hirth joint or similar mechanism) connector, thus allowing for manual adjustment of the cylindrical scoop in relationship to the handle. There is also an adjustable grip that can be positioned anywhere along the length of the pole handle. The grip provides additional leverage to manipulate the device.

The method of shaping and removing material from the bottom of a trench includes providing the tool or device disclosed herein and then extending the tool into the trench against the bottom of the trench. Rod 21 extending downwardly (FIG. 1) is then pulled to move tube 28 along the bottom of the trench with material entering the tube via opening 29. When it is determined that material has entered the tube and the tube is loaded by viewing the material located at the exit opening 30, the pole and tube may be lifted out of the trench. As it is being lifted, the side walls of the trench will constrain the loaded tube 28 and keep it from rotating. When free of the trench, and with axis 24 of rod 21 extending horizontal, the center of gravity 85 of the loaded tube 28 will be located above axis 24 (FIG. 7) and the loaded tube 28 will naturally favor rotation on the axis 24 of the pole handle. The entire device may then be rotated on the axis of the pole handle, which causes exit opening 30 to face downward, with the material within the tube then falling downwardly through opening 30, thereby emptying the tube. The positioning means 26 locates the center of gravity 85 of the loaded tube 28 above the longitudinal axis of the pole when the pole extends into the trench. Thus, as the pole is lifted from the trench to a horizontal position the loaded tube tends to rotate the tube and pole about axis 24 with the material in the tube then falling out of the tube through the rearward end. In order to level the bottom of the trench, rod 21 is sequentially pulled in a direction opposite of arrow 45 (FIG. 5) to engage the edge of the open end 29 against the trench bottom and then reversing the movement of the rod by pushing the rod in the direction of arrow 45 thereby forcing the outside surface of the radiused rearward portion extending along the distance 61 against the bottom of the trench.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

Although the description above contains specificities, these should not be construed as limiting the scope of the invention, but as merely providing illustrations of some of its presently preferred embodiments. For example, the handles, including the elbow member 26, can have different lengths to reach varying depths of holes or trenches; the cylinders can be made wider or longer depending on the application; the materials that comprise the handles and components of the invention can vary among aluminum, plastic, fiberglass, etc.; the shape of the handles can take the form of cylindrical tubing as well as square tubing; elbow member 26 may be an optional attachment or may be a permanent part of the pole assembly. Further, the trench scoop may be converted into a pick tool by removing the elbow member 26 and connecting the bottom of the pole directly to tube 28 by connector 27 allowing use of the tool as a hoe or mattock. Tube 28 may be positioned at various angles relative to the pole axis through the use of connector 27 varying the angle from 0 degrees to 180 degrees. Thus, the scope of the invention should be determined by the appended claims and their legal equivalents, rather than by the examples given.

What is claimed is:

1. A scoop for removing material from the bottom of a trench comprising:
    a pole having a longitudinal axis, a top end portion and a bottom end portion with said axis extending downward from said top portion when said pole is extended down into the trench;
    a hollow cylindrical tube with a center of gravity, with said tube connected to said pole and having a tubular wall with an exterior surface extending circumferentially 360 degrees around and defining a passage with an open forward end and an open rearward end with said exterior surface extending therebetween, said open forward end opens in a first direction and said open rearward end opens in a second direction with said first direction perpendicular to the said second direction for material to enter said passage through said open forward end and move in said passage toward said open rearward end as said pole moves said tube in a horizontal direction; and,
    positioning means, connected to said pole and to said tube, positioning said center of gravity of said tube offset from said axis.

2. The scoop of claim 1 and further comprising
    a connecting means connecting together said tube and said positioning means; and wherein:
    said positioning means includes a member extending from said pole to said tube, said tube and said center of gravity offset from said axis when said pole is extended down into the trench and when said pole is lifted from the trench.

3. The scoop of claim 2 wherein:
    said connecting means has a connector with a first mount with a flanged end fixedly secured to said exterior surface of said tube between said forward end and said rearward end and further having a second mount connected to said positioning means, said connector located exteriorly of said tube so material moving through said passage is not impeded.

4. The scoop of claim 3 wherein said top end portion forms a first handle, and further comprising a second handle mounted to said pole extending outwardly from said pole and being perpendicular to said longitudinal axis.

5. The scoop of claim 4 wherein said second handle is adjustably mounted to said pole and movable along said longitudinal axis.

6. The scoop of claim 5 wherein said exterior surface of said tubular wall forms a plow between said forward end and said rearward end, said forward end of said tube defines a circular opening with said tube having a constant inside diameter from said forward end to said rearward end.

7. The scoop of claim 6 wherein said open forward end of said tubular wall has a leading forward edge which is scalloped providing a cutting edge portion as said hollow tube is pulled through the trench to engage any compacted soil therein.

8. The scoop of claim 1 wherein said passage includes an interior rearward portion and an interior forward portion, said passage has an interior volume to receive the material with said interior volume in said rearward portion greater than in said forward portion.

9. A pole assembly for removing material from an opening in the ground comprising:
    a pole extendable into an opening in the ground and having a first handle end to be gripped as said pole is moved into and along the opening in the ground, said pole has a longitudinal axis;

a hollow cylindrical tube having an a tubular wall with an exterior surface extending circumferentially there around and defining a passage with an open forward end and an open rearward end with said exterior surface extending therebetween, said tubular wall has an elbow shape with said tubular wall forming said exterior surface, said open forward end opens in a first direction and said open rearward end opens in a second direction with said first direction perpendicular to said second direction for material to enter said passage through said open forward end and through said passage toward said open rearward end;

an adjustable connector having a first mount with a flanged end fixedly secured to said exterior surface between said forward end and said rearward end and further haying a second mount connected to said pole, said adjustable connector located exteriorly of said hollow tube so debris moving through said passage is not impeded, and, a connecting portion having a top end connected to said pole and having an opposite bottom end portion connected to said tube by said adjustable connector.

10. The assembly of claim 9 wherein said pole includes a bottom end portion and a longitudinal axis extending between said first handle end and said bottom end portion and further comprising a second handle mounted to said pole between said first handle end and said bottom end portion and extending outwardly from said first handle end being perpendicular to said longitudinal axis.

11. The assembly of claim 9 wherein said exterior surface of said tubular wall is a plow for use to level or flatten material in the trench.

12. The assembly of claim 9 wherein said passage has a constant inside diameter with said passage including a rearward portion and a forward portion, said passage has an interior volume to receive the material with said interior volume in said rearward portion greater than in said forward portion.

13. The assembly of claim 9 wherein said tube when loaded has a center of gravity, said connecting portion locates said center of gravity offset to said axis when said pole extends down into the ground.

14. A pole assembly for removing material from an opening in the ground comprising:

a pole extendable into an opening in the ground and having a longitudinal axis and a handle end to be gripped as said pole is moved into and along the opening in the ground, said pole has a pole end opposite of said handle end with said pole end being offset relative to said longitudinal axis;

a hollow cylindrical tube having a center of gravity offset relative said longitudinal axis and further having a tubular wall with an exterior surface extending circumferentially there around defining a passage with an open forward end and an open rearward end with said exterior surface extending there between, wherein said open forward end opens in a first direction and said open rearward end opens in a second direction with said first direction perpendicular to said second direction; and, a movable connector securing said tube to said pole end and having a first mount with a proximal end secured to said exterior surface between said forward end and said rearward end and further having a second mount secured to said pole end with said first mount movably connected to said second mount, said connector located exteriorly of said hollow tube so material in said passage is not impeded.

15. The assembly of claim 14 wherein said movable connector is adjustable.

* * * * *

UNITED STATES PATENT AND TRADEMARK OFFICE
CERTIFICATE OF CORRECTION

PATENT NO.       : 10,117,371 B2
APPLICATION NO.  : 14/941815
DATED            : November 6, 2018
INVENTOR(S)      : Donald J. Peterson

Page 1 of 1

It is certified that error appears in the above-identified patent and that said Letters Patent is hereby corrected as shown below:

In the Claims

Column 6, Line 65, replace "haying" with --having--
Column 7, Line 17, replace "haying" with --having--
Column 8, Line 17, insert --to-- between words "relative" and "said"

Signed and Sealed this
Twenty-third Day of April, 2019

Andrei Iancu
*Director of the United States Patent and Trademark Office*